United States Patent [19]
Morrison et al.

[11] Patent Number: 5,156,741
[45] Date of Patent: Oct. 20, 1992

[54] WASTEWATER TREATMENT SYSTEM AND METHOD

[76] Inventors: Dean N. Morrison, 12250 SW. 33rd Ave., Portland, Oreg. 97219; Marvin Daniels, 1220 SE. 31st Ave., Albany, Oreg. 97321; Frank Sinclair, 20350 SW. Avon Ct., Aloha, Oreg. 97007; G. S. Tiwari, 550 Smith Dr., Woodburn, Oreg. 97071

[21] Appl. No.: 636,062

[22] Filed: Dec. 28, 1990

[51] Int. Cl.$^5$ ................................................. C02F 3/32
[52] U.S. Cl. ...................................... 210/602; 210/17; 210/807
[58] Field of Search ....................... 210/170, 602, 807

[56] References Cited

U.S. PATENT DOCUMENTS

| | | |
|---|---|---|
| 3,770,623 | 11/1973 | Seidel . |
| 3,919,848 | 11/1975 | Sullivan . |
| 3,995,436 | 12/1976 | Diggs . |
| 4,169,050 | 9/1979 | Serfling et al. ............... 210/170 X |
| 4,678,582 | 7/1987 | Lavigne . |
| 4,749,479 | 6/1988 | Gray . |
| 4,824,572 | 4/1989 | Scott . |
| 4,839,051 | 6/1989 | Higa . |
| 4,959,084 | 9/1990 | Wolverton et al. ............ 210/602 X |

OTHER PUBLICATIONS

NaturTurf Sales Brochure, copyright 1979.

Primary Examiner—Charles Hart
Attorney, Agent, or Firm—Kolisch, Hartwell, Dickinson, McCormack & Heuser

[57] ABSTRACT

A biological treatment system and method is provided for treating wastewater from a treatment plant which provides primary and secondary treatment. An aggregate-filled bed enclosed by a water-impervious barrier is used to receive and cleanse the wastewater using the roots of turf grass grown on the top of the bed. Wastewater is introduced near the bottom of the bed and flows generally upwardly through the voids in the media, passing through the root system of the turf grass. Wastewater is withdrawn from the bed at a higher level than it is introduced. The top surface of the bed remains dry and is capable of supporting pedestrian and vehicular traffic. A recirculation system maintains the generally upward flow of water through the bed. Transpiration reduces the volume of the wastewater and the biological cleansing action of the roots cleanses the wastewater. Alternative forms of the bed are described.

24 Claims, 2 Drawing Sheets

WASTEWATER TREATMENT SYSTEM AND METHOD

BACKGROUND AND SUMMARY OF THE INVENTION

The invention relates generally to wastewater treatment for the purification of municipal sewage and more particularly to the treatment and further purification of the outflow of a municipal sewage treatment plant which performs primary and secondary treatment.

Treatment of municipal sewage is often described in a hierarchy of treatment levels. Primary treatment generally involves settling out suspended solids. Secondary treatment employs microbes which digest many of the pollutants. Tertiary treatment most generally involves a final filtration step as well as further treatment to render the effluent virtually free of pollutants. Many municipalities have wastewater treatment plants which provide primary and secondary treatment. Because of high cost, tertiary treatment is uncommon.

Heretofore, secondary treatment has been sufficient to meet state and federal pollution control regulations. Under new stricter standards being proposed and implemented, secondary treatment will not always meet the pollution control requirements for discharge into rivers and streams. Municipalities are being forced to seek methods and techniques for further purifying secondary treated wastewater. Tertiary treatment meets and exceeds pollution control requirements, but is prohibitively expensive when state-of-the-art mechanical filtration systems are used. Thus, municipalities continue to seek improved, more economical methods for treating secondary treatment outflow One known technique for purifying wastewater employs artificial wetlands containing hydrophytes such as reeds and other marsh plants. Wastewater which is introduced at or near the surface level of the ground, undergoes purification through gravity filtration and then the purified wastewater is collected substantially below the ground surface. Such methods for treating wastewater are shown in U.S. Pat. No. 4,839,051 to Higa, U.S. Pat. No. 4,824,572 to Scott and U.S. Pat. No. 4,678,582 to Lavigne.

Wetland environments cleanse polluted water, but have several disadvantages when used to treat municipal wastewater A medium-to-large city might require tens or hundreds of acres of artificial wetlands to adequately treat its secondary treated wastewater. Acreage covered with artificial wetlands is neither usable for human activities, nor easily accessible except on pathways constructed through the wetlands Treatment ponds in the form of wetlands are also often aesthetically problematic, due to unpleasant odors, and attraction of insects and the like.

There is and will continue to be an increasing need for effective, economically practical systems for purifying secondary treatment outflow from wastewater treatment plants. There is also a need for providing such treatment in or near cities in a manner which is compatible with nearby human occupation and activities. There is a further need for providing such wastewater treatment in a way which reduces both the quantity of wastewater and the pollutants it carries.

It is an object of the present invention to provide a system for treating wastewater which has received primary and secondary treatment, such wastewater being referred to as secondary treated wastewater, by reducing its volume or quantity and by cleansing the wastewater.

It is a further object of the invention to provide a system for treating secondary treated wastewater by means of relatively large biological treatment beds, extending over one or more acres of ground, which are substantially dry, hard surfaces capable of supporting wheeled vehicular traffic and which are implanted with turf grass capable of biologically cleansing the wastewater.

It is another object of the invention to provide a system for treating secondary treated wastewater using an in-ground treatment bed by extracting the cleansed wastewater from below the surface of the ground after anti-gravity flow, leaving the surface of the treatment bed substantially dry and hard.

It is yet a further object of the invention to provide a method of treating secondary treated wastewater which employs grass-covered beds of rock media which are sufficiently stable to support wheeled vehicular traffic, the beds being filled with rock pieces having a size and shape which produces voids therebetween through which liquids, including the wastewater being treated, can pass.

Accordingly, the present invention provides a near ground surface water treatment system for treating wastewater comprising a water-impervious basin which has a base, sides and an open top. The system also includes a treatment water injection system adjacent the base of the water-impervious basin. Means are provided for withdrawing treated water from the basin at a point above the water injection system. A water table is defined by the treated water withdrawal means, the water table being below the top surface of the basin. And treatment elements, preferably in the form of turf grass roots extending into the basin, are operatively interposed between the injection and withdrawal means.

In a preferred embodiment of the invention, a wastewater inlet channel is provided near the bottom of the bed and includes a pattern of perforated tubing extending through the media. An outlet channel is provided near the top of the bed. A large proportion of the outflow withdrawn from the bed near the top is recirculated back through the inflow inlet channel, where it again passes through the voids in the bed. About five-to-ten percent of the inflow into the bed is new, secondary treated wastewater from the treatment plant. In order to sustain and encourage root growth in the voids of the media, a system for aerating the wastewater in the bed is provided. The aeration system is designed to maintain a dissolved oxygen content of between about one and about seven parts-per-million in the wastewater in the bed.

Another form of the invention is a method of treating secondary treated wastewater, namely, wastewater which has received primary and secondary treatment in a wastewater treatment plant. A first step in the method is to inject waste-water at a predetermined subsurface level into a bed of rock media enclosed at the sides and bottom by a water-impervious barrier. The bed in which the wastewater is injected is formed of rock pieces with voids therebetween through which liquids are able to flow. The bed includes turf grass growing on top, with roots which extend down into the bed in the voids of the media. The next step in the method is to saturate the be with wastewater and then to withdraw wastewater from the bed at a higher level than the level at which the wastewater is injected. The preferred method also includes the step of aerating the wastewater in the bed as it is circulated through the bed. Aeration encourages and sustains root growth in the voids of the media. The wastewater circulating through the bed is treated and partially evaporated while providing water and nutrients to the roots of the turf grass. Consequently, the wastewater withdrawn from the bed at the higher level is of a greater purity and has a smaller volume than the wastewater initially injected into the bed.

DETAILED DESCRIPTION OF THE PREFERRED EMBODIMENT

The present invention harnesses the natural cleansing ability of certain species of turf grass to cleanse and purify the secondary treated wastewater outflow from a sewage treatment plant. To that end, the system and associated method of the invention provide a system for growing one or more selected varieties of turf grass, in particular Tall Fescue, in a bed of rock or gravel. The bed is designed to permit the wastewater to flow throughout the root system of the cultivated turf grass. Various steps in the treatment process help maintain the health of the turf grass, encourage long root growth, and maximize the purifying action of the plant roots on the wastewater. Other features and advantages of the wastewater treatment system will be described below in connection with the detailed description of the system.

Figure 1:
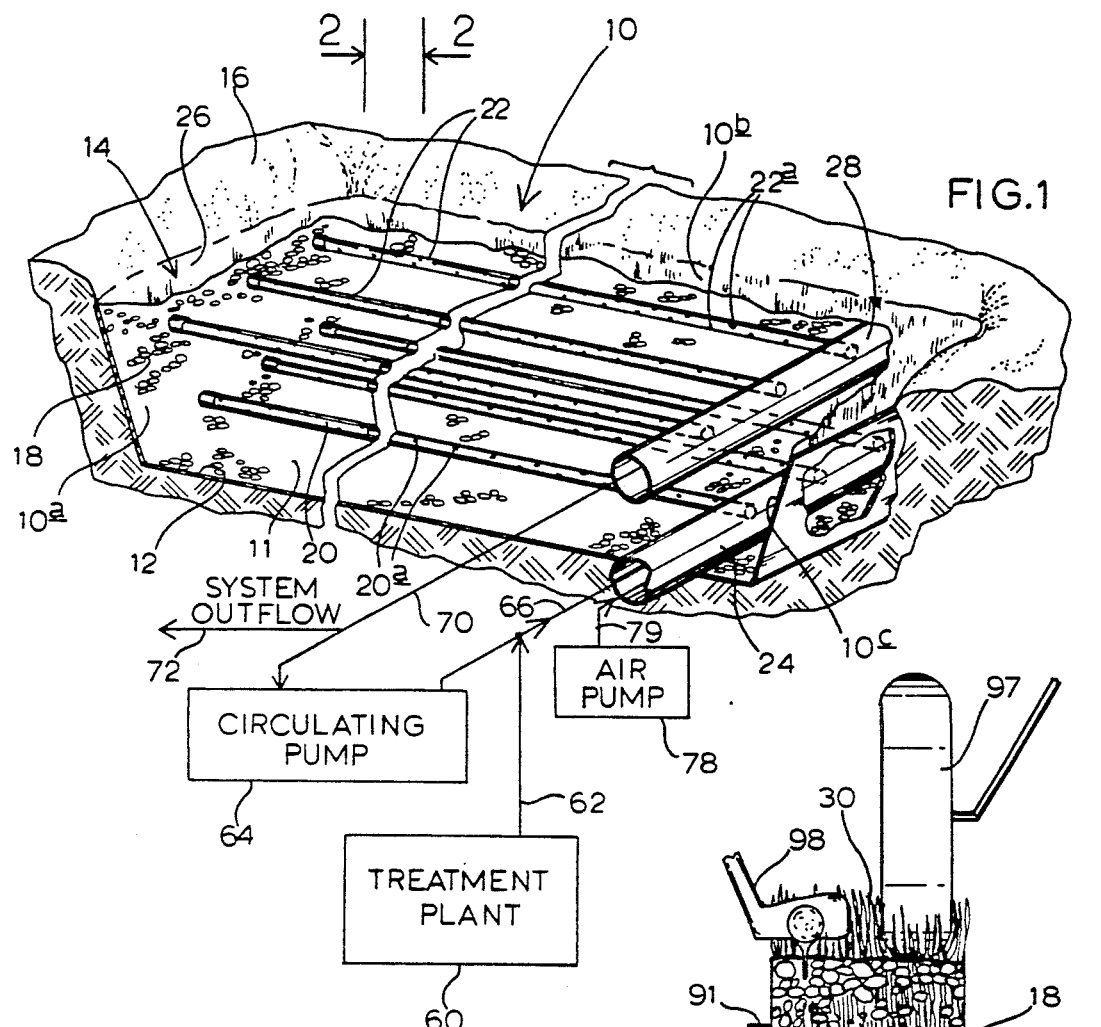
FIG. 1 is a partial, partially schematic perspective view of a system for treating wastewater in accordance with the present invention, illustrating a portion of a bed of rock media on which turf grass is grown, together with a schematic depiction of the circulation and aeration systems.

Referring to FIG. 1, a wastewater treatment bed, shown generally at 10, is formed in the ground and surrounded at sides 10a, 10b, 10c (shown in FIG. 1) and 10d (the side of the bed across its near end, not shown), and along its base or bottom 11, by a water-impervious barrier 12. The barrier is preferably a continuous sheet of a water-impervious material such as a heavy plastic material or the like which is laid into an open excavation 14 made in the ground prior to construction of bed 10. A high-density polyethylene known as HDPE is suitable for barrier 12. The water-impervious barrier completely surrounds and encloses the bottom and sides of bed 10, extending upwardly to or near the surface of the ground. Bed 10 is preferably surrounded by a continuous, enclosing ridge or mound 16, over which barrier 12 may extend. In large installations where bed 10 covers many acres of ground, barrier 12 will be formed of large separate sheets of HDPE joined together by heat fusing (i.e., heat wielding) along their respective edges to form a continuous water-impervious barrier. Barrier 12 is also defined as a means forming a water-impervious basin.

Once barrier 12 has been placed in a suitable excavation, media fill 18, composed of rock or gravel, is deposited in the bed around a system of perforated pipes which provide ingress and egress of wastewater at selected locations in the bed. Media 18 is rock or gravel of a size, shape and finish selected to produce a large void ratio when in an uncompacted aggregation. A generally rounded type of graded rock known as pea rock is a suitable media for use with the present invention. Individual rock pieces of the media will preferably be in the range of about ¼ inch to about 2-inches in diameter, with the size of the pieces generally uniform throughout the bed. Because pea rock tends to have a rounded shape, it is not favored for use in construction gravel since it does not compact readily into a stable mass. Consequently, pea rock is usually available at a lower cost than ordinary gravel. Voids between the individual rock pieces of media 18 provide the spaces in the bed through which wastewater is able to flow. A void ratio in the bed of 40% is typical for pea rock of the type described.

In describing the construction of treatment bed 10, certain dimensions will be referred to which are intended to illustrate the approximate size and configuration of a bed constructed for use with the present invention. It should be understood that the dimensions referred to are not a critical requirement for a working installation and that other dimensions may be used, consistent with the practical functioning of the apparatus.

Referring to FIG. 1, bed 10 is provided with means for circulating the wastewater which includes two sets of perforated pipes extending through the media at different levels within the bed. Lower inlet pipes 20 extend substantially horizontally below a parallel set of upper outlet pipes 22. The perforated pipes are preferably about 2-inches to 6-inches in size (inside diameter) and made of a material such as polyvinyl chloride (PVC). Each perforated pipe 20,22 has ¼ inch or smaller perforations, such as those shown in FIG. 2 at 20a and at 22a respectively, at regular intervals along its length for dispersing liquids into the bed.

The lower and upper pipes are supported within bed 10 by the surrounding rock media 18. Beds are preferably constructed 3-feet or more in depth. In a bed which is 4-feet to 5-feet in depth, lower pipes 20 may be positioned somewhere between the bottom 11 of the bed and about 1-foot to 2-feet above the bottom of the bed. Upper pipes 22 will be about ½ foot to 2-feet below the top surface 26 of bed 10.

Construction of bed 10 requires building up several layers of rock media 18. The bottom of bed 10 is first filled with rock media 18 to a level of the inlet pipes and uniformly graded to an approximately horizontal plane over the extent of the bed. Lower perforated pipes 20 are then laid on the rock media to provide an inlet channel for injecting wastewater into and through the bed. As shown in FIG. 1, each set of pipes 20 and 22 is laid in parallel rows, approximately co-planar with one another and disposed generally horizontally. At one end of bed 10, the lower inlet pipes 20 communicate with an unperforated mutual header conduit, referred to as inlet header 24. The diameter of inlet header 24 preferably exceeds the diameter of inlet pipes 20. At the opposite end of bed 10, pipes 20 and 22 are capped.

After laying down the inlet pipes 20 and inlet header 24, additional rock media is poured over the inlet pipes 20 and header 24 to a depth appropriate for positioning the outlet pipes. The rock media is then graded to an approximately horizontal plane. The second pattern of perforated pipes 22 is laid on the rock media to serve as an outlet channel for withdrawing liquids from bed 10. Outlet pipes 22 communicate with a mutual outlet header 28. Outlet header 2 is preferably an unperforated pipe having a diameter in excess of the diameter of pipes 22. After outlet pipes 22 and header 28 have been laid down, rock media is spread over the pipes to build up the bed to the top surface. Inlet pipes 20 and outlet pipes 22 each extend generally horizontally through bed 10, with pipes 20 disposed in a plane which is substantially parallel to the plane of pipes 22.

The completed media-filled bed 10 is enclosed along its bottom 11 and sides 10a, 10b, 10c, 10d, and open along its top surface 26. Inlet and outlet headers 24, 28 extend, by means of suitable seals, through one of the side walls 10 to communicate with the recirculation system outside the bed, described below.

Figure 2:
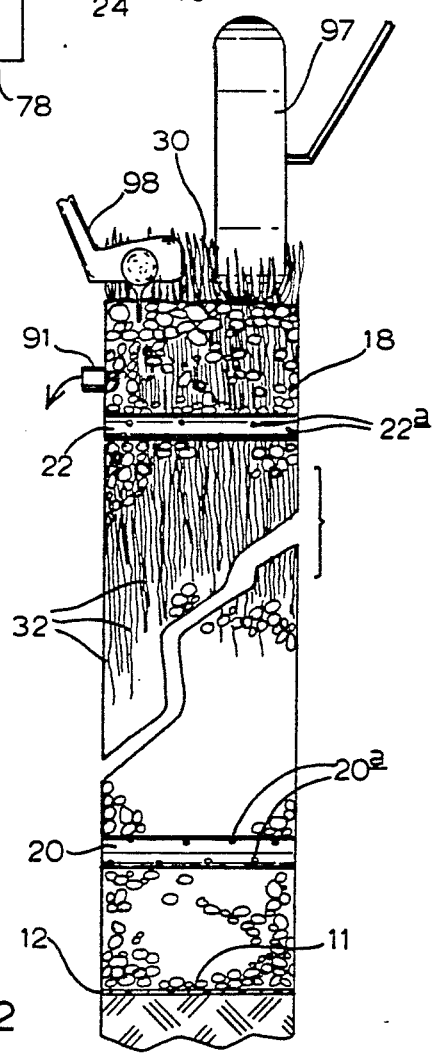
FIG. 2 is a partial, cross-sectional view of a slice of the bed shown in FIG. 1, taken generally between lines 2—2 of FIG. 1, illustrating a portion of the media bed on an enlarged scale.

Referring to FIG. 2, turf grass 30 is implanted in bed 10 on top surface 26 and serves as a biological treatment element. The original sowing of the turf grass can be done by seeds. The roots 32 of turf grass 30 eventually grow downwardly through the voids in media 18 to a substantially greater depth than outlet pipes 22, or to the bottom 11 of the bed. The roots of the turf grass, growing in the voids of the media, are operatively interposed between the injection system of the bed and the withdrawal system, meaning that the flow of wastewater passes through the turf grass root system. Turf grass is ideal as a biological water treatment agent because it is extremely hardy and easy to maintain. The preferred turf grass used with the present invention is Tall Fescue, which is known to be a good transpirator of water. Other turf grasses which are good transpirators of water may alternatively be used.

The purpose of bed 10 is to circulate the wastewater through the roots 32 of the turf grass. Purification of the wastewater circulating through the bed occurs as a result of the natural biological cleaning action of roots 32, around and through which the wastewater flows. Inlet header 24 serves as a treatment water injection means disposed adjacent the base of bed 10 for introducing wastewater into the bed through the inlet pipes 20. Once the wastewater enters bed 10 through the inlet pipes, the wastewater is dispersed through the bed by the pipes 20 of the inlet channel and flows generally upwardly (in an antigravity direction) through the voids in rock media 18 to outlet pipes 22. Outlet header 28 serves as a treated water withdrawal means disposed above the inlet header injection means, for withdrawing wastewater from bed 10. The wastewater continually feeds and sustains the root system of grass 30 as it passes through the voids in the media. Roots 32 treat the wastewater by well-known biological cleansing processes. The turf grass also transpires and evaporates some of the wastewater through transpiration, reducing its volume.

Before the introduction of wastewater into bed 10, the voids between the individual pieces of rock media 18 are open and available to receive wastewater introduced through inlet pipes 20. The wastewater enters the media in the bed through perforations 20a (FIG. 2) in inlet pipes 20. Since barrier 12 confines the inflowing wastewater within bed 10, the bed eventually becomes saturated with wastewater. In an operating system, the bed is allowed to fill with wastewater to a level above outlet pipes 22, termed the phreatic line. The bed is not allowed to fill all the way to top surface 26, in part to keep top surface 26 substantially dry. When the bed has become saturated with liquid in the voids of the media up to or above outlet pipes 22, the wastewater will begin to flow into the outlet pipes 22 through perforations 22a (FIG. 2), and out through header 28. The wastewater saturated media reaches a predetermined phreatic line, at the water table within the bed, which is at a predetermined level established by the height of the outlet pipes and the rate of withdrawal from the bed.

FIG. 1 shows a schematic representation of the interconnections between a sewage treatment plant 60 and bed 10. Treatment plant 60 is a conventional municipal sewage treatment plant which offers primary and secondary treatment of wastewater. It is the outflow from treatment plant 60 which is further cleansed by the system and method of the present invention. Secondary treated wastewater flows out of treatment plant 60 via line 62. Line 62 communicates with the inlet header 24. A means is provided for circulating wastewater through bed 10, including circulating pump 64, an inflow line 66 which communicates with inlet header 24, and outflow line 70 which communicates with outlet header 28. The wastewater is carried through outflow conduit 70, to circulating pump 64, and back to the bed through line 66. Branch conduit 72 removes a small portion of the treated wastewater flowing through the recirculation system, for final disposal. Lines 66 and 70 serve as return means for recirculating a portion of the outflow from the bed back into the bed, together with wastewater introduced into the system from treatment plant 60.

If the dissolved oxygen in bed 10 becomes depleted, root growth is severely inhibited. In fact, under most conditions, turf grass roots do not grow down into a water-saturated aggregate bed. To overcome this problem and encourage root growth into the wastewater-saturated voids between the rock media pieces, oxygen is introduced into the wastewater. For that reason, the system and method of the present invention includes a means for aerating the wastewater flowing through bed 10 in order to maintain a level of dissolved oxygen which will sustain root growth. The oxygen level considered optimal for encouraging and sustaining root growth is 5- to 6-parts-per-million (p.p.m.). The overall range of dissolved oxygen concentration for sustaining root growth is between about 1-p.p.m. and 7-p.p.m. in the combined wastewater and recirculated wastewater injected into the bed. With that concentration of dissolved oxygen, roots of Tall Fescue grass will grow downwardly at least several feet into the wastewater.

The aeration means of the present invention includes an air pump 78 and conduit means 79 for introducing compressed air into bed 10. As shown in FIG. 1, air pump 78 supplies compressed air via conduit 79 to one or more points along inlet header 24. Suitable conventional dispersal nozzles, air stones, or the like can be used to introduce air bubbles into the inlet header and from there into the bed 10. The exact quantity of and pressure of air required to achieve and maintain the 5- to 6-p.p.m. concentration of dissolved oxygen is determined by sampling the oxygen concentration in the bed and making appropriate adjustments in the air supply system.

Figure 3:
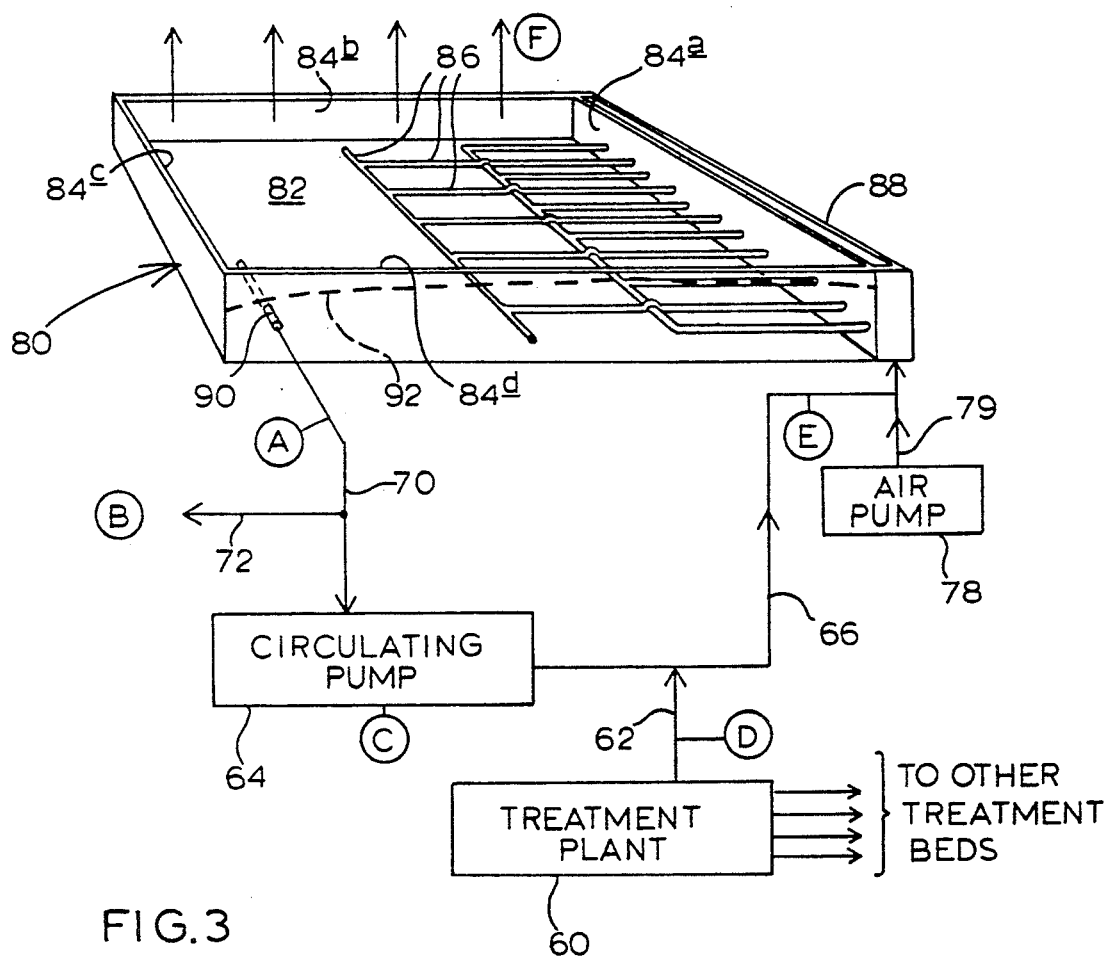
FIG. 3 is a schematic diagram of an alternative embodiment of the system for treating wastewater shown in FIG. 1, referencing various flow quantities defined in the specification, including recirculation rate, transpiration rate and the quantity of clean wastewater withdrawn from the system.

FIG. 3 shows an alternative embodiment of a wastewater treatment system for a bed 80 covering 1-acre of ground and handling a proportionate fraction of the output of a typical municipal wastewater treatment plant. Bed 80, if square, would be 208-feet on a side with a depth of 3-feet. Bed 80 includes all the elements of bed 10 in FIG. 1 including a base 82 side walls 84a, 84b, 84c, 84d and an open top. An inlet distribution system in the form of pipes 86 is provided adjacent the bottom 82. The inlet header is in the form of a 1-foot wide chamber 88, along side wall 84a. Chamber 88 can be a concrete or metal trough in the ground or, if bed 80 is above ground, provide one side wall of the bed. The other side walls 84a, 84b and 84c are depicted as generally straight, rectangular structures which could also be formed of concrete. As depicted in FIG. 3, bed 80 is schematic and may be either an in-ground bed or an above-ground structure surrounded by retaining walls or the like. Chamber 88 communicates with inlet distribution pipes 86 and serves to feed wastewater into the bed whenever the water level in chamber 88 is high enough for gravity flow into the bed to occur.

Bed 80 is filled with pea rock aggregate (not shown) and includes turf grass on its open top surface (not shown), as in the embodiment of FIG. 1. Wastewater is withdrawn from bed 80 by means of an outflow pipe 90 located in side wall 84d of the bed. As wastewater saturates the bed, a phreatic line 92 develops in the bed, representing a withdrawal water table at the level at which the voids in the aggregate are saturated with wastewater. Outflow channel 90 is positioned below phreatic line 92 and above the inlet distribution pipes 86, serving as the outlet channel for bed 80 in the same manner as outlet header 28 and associated pipes 22 in the embodiment of FIG. 1. Outlet channel 90 may be a short length of pipe with a suitable screen at its entry end to prevent clogging, or may be a length of perforated pipe. It is anticipated that in many applications a short length of pipe suitably protected against clogging will be able to function as the outflow channel. A schematic representation of such a simplified outflow channel is also shown at 91 in FIG. 2. Referring to FIG. 3, note the slight curvature in phreatic line 92 due to the slight decrease in the water table in the region adjacent the outlet channel. Outlet channel 90 helps define the water table in the bed below the top surface of the bed. Phreatic line 92 can also be referred to as the withdrawal water table 92.

System inlet line 66 pumps water into the bed by filling chamber 88 to a level above phreatic line 92, after which the wastewater flows into bed 80 by gravity. Air pump 78 is shown as discharging air into chamber 88 through line 79.

Since bed 80 in FIG. 3 is configured to position the inflow distribution pipes 86 generally on one side of the bed and the outflow channel 90 generally on the other side of the bed, at a higher level, wastewater flow in bed 80 will be both upward and laterally across the bed. This configuration may be advantageous in certain installations, in preference to the more direct upward flow of the embodiment of FIG. 1.

The circulation system for 1-acre bed 80 is the same as in the embodiment of FIG. 1 and the same reference numbers are used in FIG. 3 as were used in FIG. 1 for identical components of the system. Outflow line 70 communicates with outflow conduit 90. Branch line 72 provides the system outflow, where the cleaned wastewater is withdrawn from the system for final disposal. Circulating pump 64 recirculates the wastewater in bed 80. Treatment plant 60 supplies secondary treated wastewater to the bed via line 62. It is anticipated that a single bed will not have the capacity to handle the outflow from a treatment plant. Consequently, the plant outflow will be distributed over a plurality of separate beds. Each bed will be designed to accommodate a predetermined fraction of the wastewater output. Alternatively, a single or lesser number of beds could be employed to handle the plant output in which case the flow rate values given in the example below should be appropriately scaled.

Reference letters A-F in FIG. 3 are keyed to flow quantities in Table 1 for various parts of the system. The various flow quantities provide a representative example of the way wastewater is both cleaned and reduced in volume by bed 80.

Assume, for the following table, that plant 60 outputs one million gallons a day of secondary treated wastewater, typical for a medium-size city. Bed 80 is one of thirty 1-acre beds which receive and treat the plant's output. Therefore, bed 80 receives 1/30th of the total. Recirculating pump 64 is designed to exchange the water in bed 80 once each 24 hours, which is the recommended recirculation rate for the system.

TABLE 1

| Bed Size: 1-acre | | |
|---|---|---|
| Bed Depth: 3-feet | | |
| Bed Volume: 971,000 gallons | | |
| Wastewater in Voids: 388,400 gal. (40% void ratio) | | |
| FIG. 3 Reference | Flow-Rate (gal/min) | Definition |
| (A) | 287 | Outflow from bed 80 |
| (B) | 17 | System outflow |
| (C) | 270 | Bed recirculation rate (one exchange/day) |
| (D) | 23 | 1/30th of plant output |
| (E) | 293 | Injected into bed |
| (F) | 6 | Transpirated |

From Table 1, it can be seen that the one million gallon-per-day output of treatment plant 60, if distributed to thirty 1-acre beds, results in a wastewater flow into the bed 80 of 23 gallons/minute (1/30th of 1-million/1440 minutes-per-day). Six gallons/minute are transpirated into the atmosphere by the turf grass in bed 80. Consequently, only 17 gallons/minute must be disposed of, out of the 23 gallons/minute inflow. That represents approximately a 25% reduction in wastewater volume, which is one of the important benefits of the system.

Once the bed is up and running, most of the wastewater in the bed will be relatively "clean," meaning it will have passed many times through the bed during recirculation. Only a small fraction of the wastewater entering the bed is "new" wastewater from plant 60. Comparing the new wastewater from the plant (D) (23 gallons/minute) with the total quantity of wastewater injected into the bed at (E) (293 gallons/minute), 92% of the inflow is recirculated wastewater. Consequently, the treatment plant output is considerably diluted, maintaining predominately "clean" wastewater in bed 80. That, in turn, prevents the bed from becoming septic and killing the turf grass.

The treatment system of the present invention reduces turbidity in the water, as well as nitrates, nitrites, chlorine, phosphates and many other pollutants. It also produces about a 25% reduction in the volume of the wastewater. Because the system operates on mostly "clean" wastewater, clogging of the perforations in the inlet and outlet pipes is not a serious problem. When occasionally necessary, conventional back flushing can be employed.

According to the invention, the top surface of the treatment bed is substantially dry and sufficiently firm to support wheeled vehicles on its surface, such as the aircraft landing wheel depicted schematically at 97 in FIG. 2. Consequently, unlike artificial wetland-type treatment beds, the large beds used in the present invention are suitable to be walked on and driven across. As such, the many acres devoted to the treatment system will be both aesthetically pleasing and of potential use and benefit. The beds can support such functions as grass landing strips for general aviation aircraft, golf driving ranges (see club head 98, FIG. 2), or other useful activities. The grass should generally be cut or trimmed to maintain its peak biological efficiency, and the organic matter produced can be harvested and used for feed or compost, or dried for fuel.

Each bed will have the appearance of a flat grassy field. The final shape of the bed will be dictated by its potential end use. For example, it might be desirable to construct a series of parallel, elongated, narrow beds rather than the square configuration shown in FIG. 3. It would also be possible to construct multiple beds immediately adjacent one another, separated by water-impervious walls which can be buried just below the top surface of the beds. In that way, multiple separate beds will have the appearance of one large field.

Alternative embodiments are possible within the scope of the present invention. The size and shape of the treatment bed can vary within a wide range. As long as the principal purpose of the bed is accomplished, which is to circulate wastewater through the roots of turf grass growing on its surface, beds can vary considerably in depth and size and still function in accordance with the invention. Beds 3-feet in depth or greater will adequately support the growth of Tall Fescue grass and cleanse wastewater circulating through the bed. The roots of the grass may extend at least 3-feet down with proper aeration. Beds of greater depth will support even longer roots.

A bed in accordance with the invention could be constructed above ground and confined in other ways, such as by retaining walls. The only limitation is that, if the sides of the bed are transparent to sunlight, algae will grow within the saturated parts of the bed. It is, therefore, necessary to keep sunlight from the saturated portions of the bed.

Thus, the invention provides a system for treating wastewater which has received primary and secondary treatment by reducing the volume and the pollutants in the wastewater. The invention also provides a system for treating wastewater using large biological treatment beds covered with turf grass, the grass being sustained on a substantially dry, hard surface capable of supporting wheeled vehicular traffic or the like.

While the present invention has been shown and described with reference to the foregoing preferred embodiment, it will be appreciated by others skilled in the art that changes in detail and form may be made without departing from the spirit and scope of the invention as defined in the appended claims.

What is claimed is:

1. A near ground surface water treatment system comprising:
    means forming a water-impervious basin, with the basin having a basin with sides and an open top,
    treatment water injection means disposed adjacent the base of the basin,
    treated water withdrawal means disposed above said injection means, defining a withdrawal water table,
    aggregate media in the basin covering said injection said withdrawal means and extending above said withdrawal water table to provide a top surface on the aggregate media which is substantially dry and firm, and
    treatment elements operatively interposed said injection and withdrawal means.

2. A system for treating waste water as in claim 1, which further includes a media of rock pieces having voids therebetween through which wastewater is able to flow, with said media disposed in the basin and surrounded by said means forming a water-impervious basin, and wherein said treatment elements include roots of turf grass implanted in said media on the top surface thereof.

3. A system for treating wastewater which has received primary and secondary treatment in a wastewater treatment plant, comprising:
    a bed of media surrounded at the sides and bottom by a water-impervious barrier and having an open top surface, said media being formed predominately of rock pieces having voids therebetween through which the wastewater is able to flow,
    turf grass implanted in the top of said bed having roots extending downwardly into said bed in the voids of said media,
    means for injecting the wastewater into said bed near the bottom thereof,
    means for withdrawing outflow from said bed below the top thereof,
    circulating means for circulating wastewater through the bed between the means for injecting and the means for withdrawing, such that the wastewater flow through the voids in said media includes a generally upward flow, and
    the water table in said bed of media being below the top of the bed to provide a substantially dry, firm top surface in which the turf grass is implanted, whereby the wastewater sustains and is treated by the roots of said turf grass.

4. A system for treating wastewater as in claim 3 in which said bed of media has a depth of at least three feet.

5. A system for treating wastewater as in claim 3 in which said circulation means includes return means for recirculating a portion of the outflow back into said bed together with the wastewater.

6. A system for treating wastewater as in claim 5 in which the combined wastewater and recirculated outflow injected into said bed is less than 10% newly-injected wastewater and at least 90% recirculated outflow.

7. A system for treating wastewater as in claim 3 in which said circulation means includes an inlet channel for dispersing liquids through said bed near the bottom of said bed.

8. A system for treating wastewater as in claim 7 in which the inlet channel includes perforated tubing positioned within said bed near the bottom thereof and a chamber communicating with the perforated tubing.

9. A system for treating wastewater a in claim 3 in which said media is predominately formed of rock pieces having sizes in the range of ¼ inch to 2-inches in diameter.

10. A system for treating wastewater as in claim 3 in which said media is predominately formed of rock pieces under 2 inches in diameter and having a finish and size which maximizes the void ratio in an uncompacted aggregation.

11. A system for treating wastewater as in claim 3 in which said turf grass is Tall Fescue.

12. A system for treating wastewater as in claim 3, which further includes aeration means for introducing dissolved oxygen into said bed to maintain a dissolved oxygen content of between about 1 p.p.m. and about 7 p.p.m. in the wastewater in said bed.

13. A system for treating wastewater which has received primary and secondary treatment in a wastewater treatment plant, comprising:
   a bed of uncompacted rock media in which the individual media pieces are of a size and shape to create a void ratio in the bed, said bed being enclosed on the bottom and sides by a water-impervious barrier,
   turf grass implanted in the top surface of said bed having roots extending through the voids of said media,
   circulating means for moving wastewater through said bed, including inlet and outlet channels for respective inflow and outflow of wastewater through said bed, said inlet channel extending through said media for dispersing wastewater therethrough below the level of said outlet channel, and said outlet channel being positioned below the top surface of said bed to maintain the top surface substantially dry, whereby the roots of the turf grass treat the wastewater injected into said inlet channel and help hold the media in position to produce a firm, dry top surface of turf grass on the bed.

14. A system for treating wastewater as in claim 13 in which said circulation means further includes return means for recirculating a portion of the outflow into the inflow, whereby the recirculated portion of the outflow passes again through said bed.

15. A system for treating wastewater as in claim 14 in which the percentage of newly-injected wastewater in the inflow is less than approximately 10%, the remainder of the inflow being recirculated outflow.

16. A system for treating wastewater as in claim 13 in which said inlet and outlet channels each includes a pattern of perforated tubing extending generally horizontally through said bed in planes which are substantially parallel to each other.

17. A system for treating wastewater as in claim 16 in which said bed includes a generally horizontal top surface on which said turf grass is implanted and said pattern of perforated tubing included in said outlet channel is positioned about 1-foot from said top surface.

18. A system for treating wastewater as in claim 13, which further includes aeration means for introducing dissolved oxygen into the inflow of wastewater into said inlet channel to maintain a dissolved oxygen content in the inflow of between about 1 p.p.m. and about 7 p.p.m.

19. A method of treating wastewater which has received primary and secondary treatment in a wastewater treatment plant, comprising the steps of:
   injecting wastewater at a predetermined subsurface level into a bed of rock media enclosed at the sides and bottom by a water-impervious barrier, the bed being formed predominately of rock pieces with voids therebetween through which wastewater is able to flow, and the bed including turf grass growing thereon having roots which extend down into the bed in the voids of the media,
   saturating the bed with wastewater to a predetermined subsurface level which maintains the top surface of the bed, in which the turf grass grows substantially dry, and
   withdrawing wastewater from the bed at a higher level than the level at which the wastewater is injected.

20. A method of treating wastewater as in claim 19 which further includes the step of recirculating a portion of the wastewater withdrawn into the wastewater injected into the bed.

21. A method of treating wastewater as in claim 20 which further includes the step of aerating the wastewater and recirculated wastewater injected into the bed, whereby the wastewater is treated and partially evaporated while providing water and nutrients to the roots of the turf grass.

22. A method of treating wastewater as in claim 19 in which said step of injecting wastewater into the be includes dispersing the wastewater in said bed by means of perforated inlet tubing extending through the media at th predetermined subsurface level.

23. A method of treating wastewater as in claim 19 in which said step of withdrawing wastewater from the be includes providing a pattern of perforated outlet tubing extending through the media at said higher level, and the step of saturating includes allowing the bed to become saturated with wastewater in the voids of the media up to at least said higher level, whereby wastewater will generally surround and flow into the outlet tubing for withdrawal from the bed.

24. A method of treating wastewater as in claim 21 in which said aerating step includes maintaining a dissolved oxygen content of between about 1 p.p.m. and about 7 p.p.m. in the combined wastewater and recirculated wastewater injected into the bed.

* * * * *